United States Patent [19]

Lew

[11] Patent Number: 4,803,870
[45] Date of Patent: Feb. 14, 1989

[54] VORTEX SHEDDING FLOWMETER WITH MECHANICALLY AMPLIFYING PRESSURE SENSOR

[76] Inventor: Hyok S. Lew, 7890 Oak St., Arvada, Colo. 80005

[21] Appl. No.: 12,680

[22] Filed: Feb. 9, 1987

[51] Int. Cl.$^4$ ............................................. G01F 1/32
[52] U.S. Cl. ............................ 73/861.22; 73/861.24; 73/DIG. 4
[58] Field of Search .......... 73/861.22, 861.23, 861.24, 73/DIG. 4

[56] References Cited

U.S. PATENT DOCUMENTS

| | | | |
|---|---|---|---|
| 3,564,915 | 2/1971 | Tomota et al. | 73/861.24 |
| 4,470,310 | 9/1984 | Tsurooka et al. | 73/861.24 |
| 4,694,702 | 9/1987 | Amemori et al. | 73/861.24 |

FOREIGN PATENT DOCUMENTS

| | | | |
|---|---|---|---|
| 58-180435 | 10/1984 | Japan | 73/861.22 |
| 60-21418 | 2/1985 | Japan | 73/861.22 |
| 823684 | 10/1955 | United Kingdom | 73/861.24 |

Primary Examiner—Stewart J. Levy
Assistant Examiner—Robert P. Bell

[57] ABSTRACT

This invention discloses a vortex shedding flowmeter comprising a vortex generator-detector constructed into an integrated assembly wherein the vortex shedding frequencies are detected by a pressure detector including at least one panel of extended surface area, which are pivotably or flexibly confined within a planar cavity included in the bluff body that generates a series of vortices shed from the two sides thereof in an alternating pattern at frequencies substantially proportional to the velocity of the fluid stream wherein the bluff body is immersed. The two opposite planar walls of the planar cavity confining a pressure detector panel respectively include a plurality of small holes open to each of the two sides of the bluff body. The fluctuations in the fluid pressure created by the vortices shed from the two sides of the bluff body in an alternating pattern produce alternating pressure differences across the pressure detector panel and, consequently, creates oscillatory pivoting or flexing motions thereof, which are detected by a transducer connected to the pressure detector panel assembly, that may include a single pressure panel of a large surface area or a plurality of pressure panels disposed in a parallel arrangement and connected to a single transducer.

19 Claims, 2 Drawing Sheets

VORTEX SHEDDING FLOWMETER WITH MECHANICALLY AMPLIFYING PRESSURE SENSOR

BACKGROUND OF THE INVENTION

The vortex shedding flowmeters commercially available at the present time determine vortex shedding frequencies by measuring the effect of the pressure fluctuations occuring in the immediate vicinity of the bluff body or by detecting the action of sinuating streamlines in a downstream region. In present day technology, the pressure fluctuations accompanying vortex shedding are measured by detecting the side-to-side deflection of the bluff body resulting from the pressure difference across the two sides thereof, or by measuring the deflection of a diaphragm with two sides respectively exposed to two pressure holes open to the two sides of the bluff body, respectively. The side surface area of the bluff body as well as the area of the diaphragm with each side exposed to a single pressure hole is generally limited to a small size. As a consequence, the existing method of detecting the pressure fluctuations accompanying vortex shedding is effective only for the vortices of sizable intensity, which is generally proportional to the square of the fluid velocity. The existing vortex shedding flowmeters employing the aforementioned pressure detection method fail to measure air velocities less than 25 feet per second under the standard condition and the water velocities less than 1.5 feet per second. The cord length of the wing employed in today's vortex shedding flowmeters for measuring the lift force created by the sinuating streamlines produced by the vortices cannot be greater than four times the bluff body width, as the wave length of the sinuation streamlines is about eight times the bluff body width. Consequently, the surface area of the wing employed for detecting the effect of the sinuating streamlines is generally limited to a small size. The existing vortex shedding flowmeters employing a wing fail to measure air velocities less than 20 feet per second and water velocities less than 1.0 feet per second. It is well established fact that the vortices are shed in regular pattern at velocities as low as a few feet per second for air flow under the standard condition and a fraction of a foot per second for water flow. There are numerous applications in the industries where the measurement of air velocities less than 10 feet per second and water velocities less than 1.0 feet per second is required. The present day vortex shedding flowmeters have failed to meet such requirements.

SUMMARY OF THE INVENTIONS

The primary object of the present invention is to provide a vortex shedding flowmeter with a pressure sensing means for measuring the vortex frequencies, which means include a single pressure detector panel of a large surface area or a plurality of parallel pressure detector panels connected to each other wherein the two sides of each pressure detector panel are respectively exposed to the fluctuating pressures at the two sides of the bluff body.

Another object is to provide a vortex shedding flowmeter with a pressure sensing means including one or more pressure detector panels respectively included in a planar cavity wherein each of the two opposite walls thereof include a plurality of pressure holes open to each of the two sides of the bluff body.

A further object is to provide a vortex shedding flowmeter with a pressure sensing means wherein the planar cavity confining the pressure detector panel is included within the bluff body or within the bluff body and downstream extension thereof.

Yet another object is to provide a vortex shedding flowmeter with a pressure sensing means wherein the pressures at the two sides of the bluff body communicate through one or more pressure holes connecting the two sides of the bluff body at the junction between the bluff body and the trailing edge extension thereof.

Yet a further object is to provide a vortex shedding flowmeter including a transducer that detects oscillatory pivoting motions of the pressure detector panel or panels about an axis parallel to the lengthwise axis of the bluff body.

Still another object is to provide a vortex shedding flowmeter including a transducer that detects oscillatory pivoting motions of the pressure detector panel or panels about an axis parallel to the direction of the fluid flow.

Still a further object is to provide a vortex shedding flowmeter including a transducer that detects oscillatory flexing motions of the pressure detector panel or panels.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
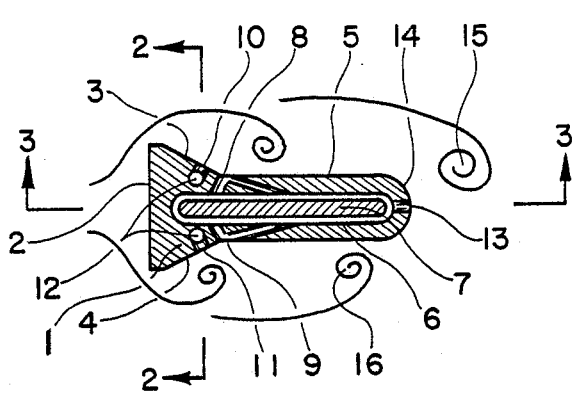
FIG. 1 illustrates a cross section of an embodiment of the combination of a bluff body and a pressure detector panel constructed in accordance with the principles of the present invention.

In FIG. 1 there is illustrated a cross section of an embodiment of the combination of a bluff body and a pressure detector panel arranged in accordance with the principles of the present invention, which cross section is taken along a plane perpendicular to the lengthwise axis of the bluff body and parallel to the direction fo the fluid flow. The first principal element of the vortex generator-detector included in the vortex shedding flowmeter of the present invention comprises bluff body and trailing edge extension 1 that is an elongated member disposed in a perpendicular angle with respect to the direction of the fluid flow, which includes a blunt loading edge side 2 squarely facing the fluid flow and the two lateral sides 3 and 4 and a trailing edge extension 5. The combination of a bluff body-trailing edge extension 1 includes a planar cavity 6 that contains a pressure detector panel 7 which is the second principal element. The space between the wall of the cavity 6 and the surfaces of the pressure detector panel 7 has to be reasonably small. It is generally desirable that the pressure detector panel 7 must be clearly separated from at least one side wall of the planar cavity 6. A first set of plurality of holes 8 disposed through one side wall of the planar cavity 6 emerges from one lateral side 3 of the bluff body in a concentrated pattern at a locality intermediate the leading and trailing edges of the bluff-body trailing edge extension combination 1. A second set of a plurality of holes 9 disposed through the other side wall of the planar cavity 6 emerges from the other lateral side 4 of the bluff body in a concentrated pattern at a locality intermediate the leading and trailing edges of the bluff body-trailing edge extension combination 1. A set of blind holes 10 open to one lateral side 3 and another set of blind holes 11 open to the other lateral side 4 are connected to each others by a pressure communicating hole 12 routed through the bluff body around the planar cavity 6. The extremity of the planar cavity 6 adjacent to the trailing edge may include one or more openings 13 breaking through the trailing edge 14 of the bluff body-trailing edge extension combination 1. The fluid flowing in the direction from the leading edge 2 to the trailing edge 14 of the bluff body-trailing edge extension combination 1 produces two rows of vortices 15 and 16 respectively shed from the two lateral sides 3 and 4 of the bluff body in an alternating pattern, wherein the frequency of the vortex shedding is proportional to the fluid velocity.

Figure 2:
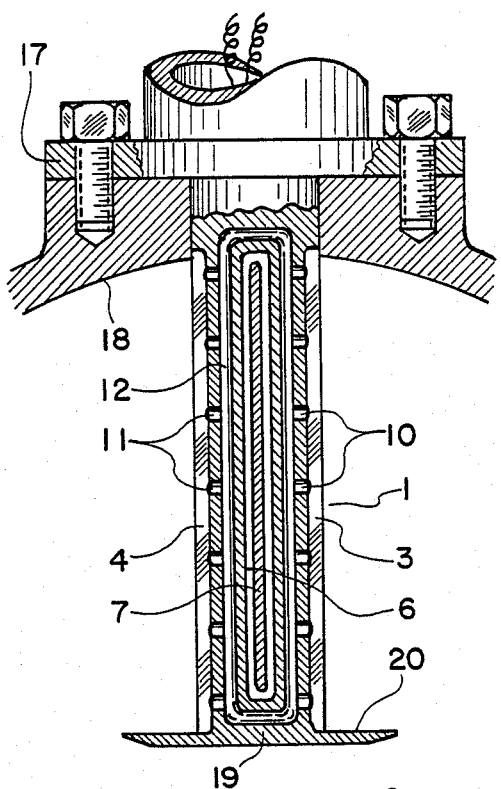
FIG. 2 illustrates another cross section of the embodiment illustrated in FIG. 1.

In FIG. 2 there is illustrated another cross section of the combination of bluff body-trailing edge extension 1 shown in FIG. 1, which cross section is taken along plane 2—2 as shown in FIG. 1. The combination of bluff body-trailing edge extension 1 extends from an anchoring or securing flange 17 secured to the conduit wall 18, and extends through the conduit wall 18 and into the interior of the conduit, wherein it is disposed all the way or partially across a cross section of a flow passage provided by the conduit. The two sets of blind holes 10 and 11 respectively open to the two lateral sides 3 and 4 of the bluff body are connected to each others by the pressure communicating holes 12 routed through the bluff body around the planar cavity 6. The pressure detecting panel 7 is contained within the planar cavity 6. The combination including the bluff body-trailing edge extension 1 and the pressure detecting panel 7 enclosed within the planar cavity 6 generates vortices and detects the vortex shedding and, consequently, this combination will be called the "vortex generator-detector" hereafter. When the vortex generator-detector extends all the way across a cross section of the flow passage, the extremity 19 thereof opposite to the anchoring flange 17 should be secured to the conduit wall. When the vortex generator-detector extends partially across a cross section of the fluid passage, the extremity 19 opposite to the anchoring flange 17 should include a flow guide or flow straightener 20 that prevents the fluid from flowing around the extremity 19.

Figure 3:
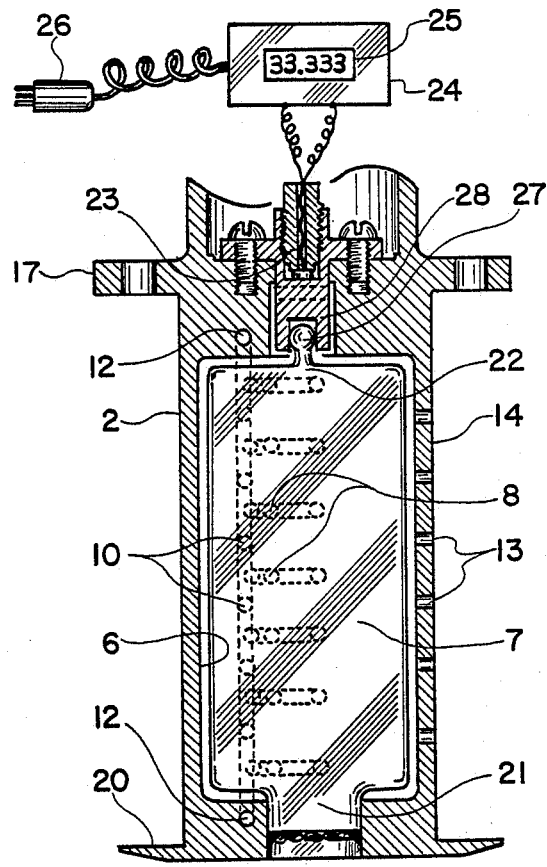
FIG. 3 illustrates a further cross section of the embodiment illustrated in FIG. 1.

In FIG. 3 there is illustrated a further cross section of the vortex generator-detector shown in FIGS. 1 and 2, which cross section is taken along plane 3—3 as shown in FIG. 1. In this cross section view, the plurality of through holes 8 extending from one side wall of the planar cavity 6 to one lateral side 3 of the bluff body as well as the plurality of blind hole 10 connected to the pressure communicating hole 12 are clearly illustrated. One extremity 21 of the pressure detector panel 7 is secured to the corresponding extremity of the bluff body-trailing edge extension combination 1, wherein the former may be fixedly secured to the latter as shown in the illustrated embodiment or it may be simply or pivotably secured instead of the fixed securement. The other extremity 22 of the pressure detecting panel 7 is connected to a transducer 23 such as a piezo electric transducer that converts the oscillatory lateral deflections of the pressure detector panel 7 to alternating electromotive forces. The electronic signal processor 24 analyzes the output from the transducer 23 and provides data related to the vortex shedding frequency or the fluid velocity obtained therefrom, which data may be displayed by a data display means 25 or transmitted out by an output means 26. In the illustrated embodiment the other extremity 22 of the pressure detector panel 7 is connected to the transducer assembly 23 by means a swivel joint or pivoting joint including a ball joint 27 engaging a socket 28.

Figure 4:
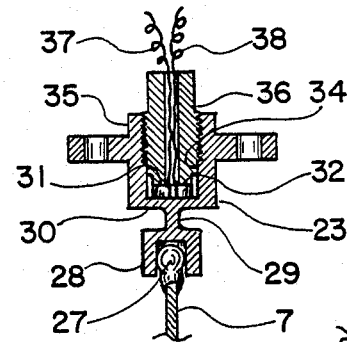
FIG. 4 illustrates a cross section of an embodiment of a transducer employed in the combination shown in FIGS. 1, 2 and 3.

In FIG. 4 there is illustrated a cross section of the transducer 23 taken along a plane including the central axis thereof and perpendicular to the chord line of the pressure detector panel 7. The pivotable joint comprising the ball 27-socket 28 is connected to a rib member 29 extending from a thin flange 30 that is under a pressurized contact with a pair of piezo electric crystals 31 and 32, which are disposed in a mirror image to one another with respect to a plane including the central plane of the rib member 29 and that of the pressure detector panel 7. The pair of piezo electric crystals 31 and 32 are contained in a cavity 34 included in a transducer vessel 35 wherein the cavity 34 is sealed by a threaded plug 36 that compresses the two piezo electric crystals 31 and 32 onto the thin flange 30. The pair of electrical wires 37 and 38 respectively connected to the two piezo electric crystals 31 and 32 are routed through a hole disposed through the threaded plug 36. As shown in FIG. 3, the transducer vessel 35 is rigidly secured to the holder or flange structure supporting the vortex generator-detector combination comprising the bluff body and the pressure detector panel.

The vortex shedding flowmeter or the vortex generator-detector illustrated in and described in conjunction with FIGS. 1, 2, 3 and 4 operates on the following principles : The two rows of vortices 15 and 16 respectively being shed from the two lateral sides 3 and 4 of the bluff body in an alternating pattern raises and lowers the fluid pressure at the two lateral sides 3 and 4 in the same alternating pattern. The alternately rising and falling fluid pressures on the two lateral sides 3 and 4 in 180 degree phase difference are transmitted to the two sides of the pressure detector panel 7 and, consequently, the pressure detector panel 7 experiences alternating lateral loadings thereon that result in alternating lateral flexing motions thereof. Such alternating lateral flexing motions of the pressure detector panel 7 produce alternating pivoting motions of the rib 29 about an axis coinciding with the line of intersection between the rib 29 and the thin flange 30, which alternating pivoting motions alternatively increase and decrease the pressure on the two piezo electric crystals that generate alternating electromotive forces directly related to the lateral flexing motions of the pressure detector panel 7. As a consequence, the frequencies of the alternating electromotive forces induced between the two piezo electric cyrstals 31 and 32 are the same as the vortex shedding frequencies, that is proportional to the fluid velocity in a wide Reynolds number range that includes practically all ranges of the fluid velocity measurements required in the industries. The electronic processor 24 receiving the signals from the transducer 23 through the two conducting wires 37 and 38 filters the noises and amplifies the vortex signals, which are then analyzed and converted to vortex shedding frequencies, or fluid velocities, or volume or mass flow rates.

The first novelty or ingenuity included in the present invention is the "large surface area" of the pressure detector panel that is exposed to the fluid pressure transmitted through the "plurality of pressure transmitting holes" originating in a "concentrated pattern" from a "linear locality" intermediate the bluff body and the trailing edge extension thereof. The large surface of the pressure detector panel cannot be exposed directly to the fluid stream because the pressure fluctuations take place in different phase relations in the time structure at different localities and, consequently, the pressure fluctuations at different localities cancel each other rather than build up when the large surface area of the pressure detector panel is exposed to pressures at different localities. The pressures loading the pressure detector panel of large surface area have to originate from a linear locality a certain distance away from the leading edge side of the bluff body. The pressure detector panel of large surface area of the present invention mechanically amplifies the pressure signal transmitted from the desired localities in much the same way as the diaphragm of large surface area employed in the stethoscope. The stethoscope enables one to listen to sounds that cannot be heard otherwise. The vortex generator-detector of the present invention enables one to detect the vortices generated in the low velocity flows, which cannot be detected with the existing vortex flowmeter technology.

The second novelty or ingenuity of the present invention is the use of the pressure communicating holes that allow the pressures at the two lateral sides of the bluff body to communicate therebetween. The phenomenon of fluid dynamic instability that causes the vortices to shed from the two lateral sides of the bluff body is closely related to the interaction of the fluid pressures at the two lateral sides, as the peak and valley of the pressure wave have to shift back and forth between the two lateral sides of the bluff body in order to generate and shed vortices in a regular pattern. The pressure transmitting holes open to the pressure detector panel may be located downstream of the pressure communicating holes as in the case of the illustrated embodiment or the former may be located intermediate the leading edge face of the bluff body and the latter.

Figure 5:
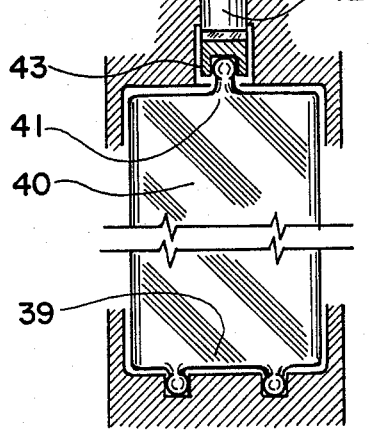
FIG. 5 illustrates a cross section of another embodiment of the combination of a bluff body and a pressure detector panel constructed in accordance with the principles of the present invention.

In FIG. 5 there is illustrated a cross section of another embodiment of the vortex generator-detector, which cross section is equivalent to that shown in FIG. 3, having essentially the same construction as the combination shown in FIGS. 1, 2, 3 and 4 with one exception being that one extremity 39 of the pressure detector panel 40 is simply supported by a pivoting or swivel joint, while the other extremity 41 is connected to a transducer 42 by a swivel or pivoting joint 43. It should be understood that the one extremity of the pressure detector sensor may be connected to the bluff body or structure supporting thereof by a simple or fixed or semifixed manner, while the other extremity may be connected to the transducer by a swivel or pivoting joint or by a fixed or rigid joint.

Figure 6:
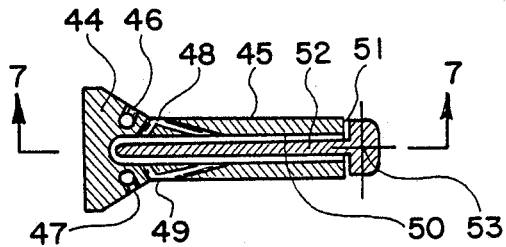
FIG. 6 illustrates a cross section of a further embodiment of the combination of a bluff body and a pressure detector panel constructed in accordance with the principles of the present invention.

In FIG. 6 there is illustrated a cross section of a further embodiment of the vortex generator-detector having essentially the same construction as the combination shown in FIGS. 1, 2 and 3 with a few exceptions, which cross section is taken along a plane perpendicular to the lengthwise axis of the bluff body and parallel to the direction of the fluid flow. The combination of the bluff body 44 and the trailing edge extension 45 includes two sets of pressure communicating holes 46 and 47 and two sets of pressure transmitting holes 48 and 49 open to the planar cavity 50 that are open to the trailing edge 51 of the combination of the bluff body 44 and the trailing edge extension 45. The planar cavity or planar slot 50 receives the pressure detector panel 52 that is pivotably supported about a pivoting axis 53. It should be mentioned that the two sets of pressure transmitting holes 48 and 49 may be located intermediate the leading edge of the bluff body 44 and the two sets of the pressure communicating holes 46 and 47, respectively.

Figure 7:
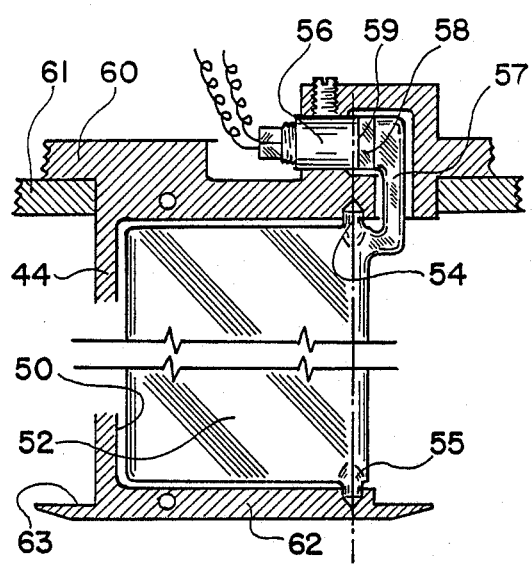
FIG. 7 illustrates another cross section of the combination illustrated in FIG. 6.

In FIG. 7 there is illustrated another cross section of the vortex generator-detector shown in FIG. 6, which cross section is taken along plane 7—7 as shown in FIG. 6. The pressure detector panel 52 engaging the open planar cavity or planar slot 50 with clearance is pivotably supported by a pair of pivoting hines or pivotable supports 54 and 55 respectively included in the two extremities of the pressure detector panel 52 adjacent one edge thereof. Therefore, the two relative pressure loadings of opposite signs respectively exerted on the two sides of the pressure detector panel 52 produce oscillatory pivoting motions of the pressure detector panel 52 about the pivoting axis passing through the pivoting hinges 54 and 55. Such oscillatory motions of the pressure detector panel 52 are transmitted to the transducer 56 having the same construction as that illustrated in FIG. 7. The transmitter arm 57 mechanically couples the pressure detector panel 52 to the rib 58 extending from the thin flange 59, which is disposed on a plane including the pivoting axis passing through pivoting hinges 54 and 55 and perpendicular to the direction of the fluid flow. The pair of piezo electric crystals are disposed in a mirror image to one another about a plane including the pivoting axis passing through the pivoting hinges 54 and 55 and parallel to the direction of the fluid flow. The vortex generator-detector extending from an anchoring or securing flange 60 secured to the wall 61 of the pipe or conduit providing the flow passage, extends through the pipe wall and into the fluid passage. The extremity 62 of the vortex generator-detector may be anchored or secured to the pipe wall or terminated in the fluid stream. In the latter case, it is necessary to include a flow guide or flow straightener 63 that prevents the fluid from flowing around the free standing extremity of the vortex generator-detector. The transducer arranged in conjunction with the pivoting pressure detector panel 52 is more immune to the noise created by the pipe vibration compared with the transducer arranged in conjunction with the flexing pressure detector panel shown in FIG. 3, as the former is susceptive to the axial vibration of the pipe while the latter is susceptive to the lateral vibration of the pipe which is much more pronounced than the axial vibratoin in most industrial applications.

Figure 8:
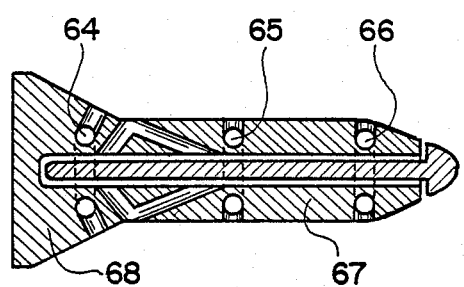
FIG. 8 illustrates a cross section of yet another embodiment of the combination of a bluff body and a pressure detector panel of the present invention.

In FIG. 8 there is illustrated a cross section of yet another embodiment of the vortex generator-detector of the present invention having essentially the same construction as that described in conjunction with FIGS. 6 and 7, which cross section shows a view equivalent to that shown in FIG. 6. This embodiment includes a series of sets of pressure communicating holes 64, 65, 66, etc., which are distributed over the entire length of the trailing edge extension 67 downstream of the bluff body 68. The embodiment described in conjunction with FIGS. 1, 2 and 3 may include a plurality of sets of pressure communicating holes instead of one set, as exemplified by the embodiment shown in FIG. 8.

Figure 9:
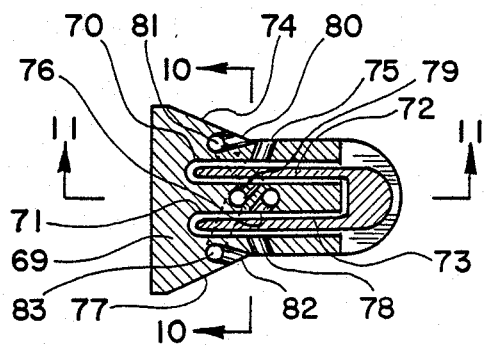
FIG. 9 illustrates a cross section of an embodiment of the combinatin of a bluff body and compound pressure detector panels arranged in accordance with the principles of the present invention.

In FIG. 9 there is illustrated a cross section of a vortex generatordetector, which cross section is taken along a plane perpendicular to the lengthwise axis thereof and parallel to the direction of the fluid flow. This embodiment of the vortex generator-detector does not include a trailing edge extension such as those elements 5 and 45 respectively shown in FIGS. 1 and 6. The bluff body 69 includes a pair of planar slots 70 and 71 disposed in a side-by-side arrangement parallel to the lengthwise axis thereof and parallel to the direction of the fluid flow. A pair of pressure detector panels 72 and 73 connected to one another at the trailing edge thereof engage the two planar slots 70 and 71, respectively. The first sides of the pressure detector panels 72 and 73 facing the first lateral side 74 of the bluff body 69 are exposed to the fluctuating fluid pressure on the first lateral side 74 by means of the two sets of the plurality of pressure transmitting holes 75 and 76, respectively, which pressure transmitting holes are disposed through the one side wall of the planar slots 70 and 71 and break through the first lateral side 74 of the bluff body 69. The second sides of the pressure detector panels 72 and 73 facing the second lateral side 77 of the bluff body 69 are exposed to the fluctuating fluid pressure on the second lateral side 77 by means of the two sets of pluralities of pressure transmitting holes 78 and 79, respectively, which pressure transmitting holes are disposed through the other walls of the planar slots 70 and 71 and break through the second lateral side 77 of the bluff body 69. The plurality of pressure transmitting holes 76 open to the planar slot 71 are connected to the second plurality of holes 80 breaking through the first lateral side 74 of the bluff body 69 by a hole 81 disposed through the bluff body and around the first planar slot 70, while the plurality of the pressure transmitting holes 79 open to the first planar slot 70 are connected to the plurality of holes 82 breaking through the second lateral side 77 of the bluff body 69 by a hole 83 disposed through the bluff body and around the second planar slot 76. It should be mentioned that the holes breaking through the lateral sides of the bluff body should be concentrated at a linear locality of an optimum distance measured from the leading edge face of the bluff body where the pressure fluctuations created by the vortex shedding are maximum.

Figure 10:
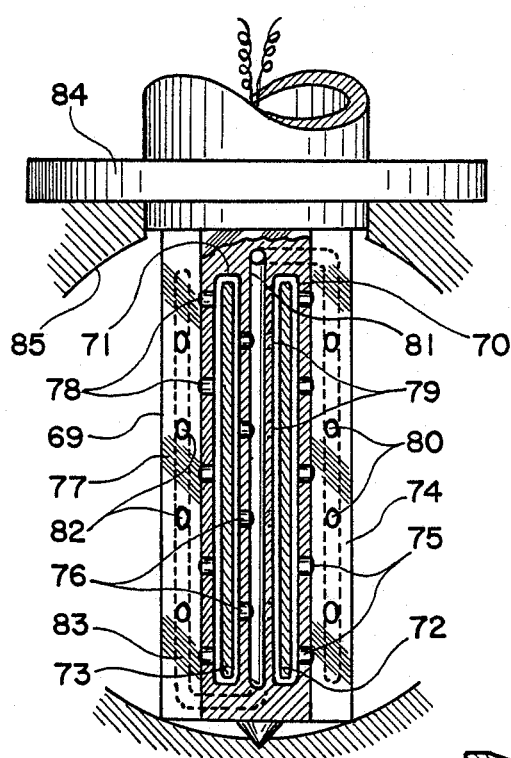
FIG. 10 illustrates another cross section of the combination shown in FIG. 9.

In FIG. 10 there is illustrated another cross section of the vortex generator-detector shown in FIG. 9, which cross section is taken along plane 10—10 as shown in FIG. 9. The combination of the bluff body and pressure detector panel assembly extending from an anchoring or securing flange 84 that is secured to the wall 85 of the pipe or conduit, extends through the pipe wall and into the flow passage. The extremity of the vortex generator-detector opposite to the anchoring flange 84 may extend all the way to the pipe wall and be secured thereto, or it may terminate amid the fluid passage as illustrated in FIG. 2. The plurality of pressure transmitting holes 75 extend from the first lateral side 74 of the bluff body 69 to the first planar slot 70, while the plurality of the pressure transmitting holes 78 extend from the second lateral side 77 of the bluff body to the second planar slot 71. The plurality of the blind holes 80 open to the first lateral side 74 of the bluff body are connected to the plurality of the blind holes 76 open to the second planar slot 71 by the hole 81 disposed through the bluff body around the first planar slot 70. The plurality of the blind holes 82 open to the second lateral side 77 of the bluff body are connected to the plurality of blind holes 79 open to the first planar slot 70 by the hole 83 disposed through the bluff body aroudn the second planar slot 71. In the cross sectional view shown in FIG. 10, the portion of the hole 83 manifolded to the blind holes 79 is located behind the hole 81 manifolded to the blind holes 76.

Figure 11:
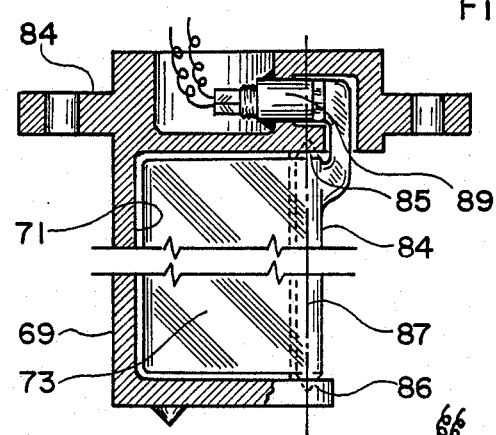
FIG. 11 illustrates a further cross section of the combination shown in FIG. 9.

In FIG. 11 there is illustrated a further cross section of the vortex generator-detector shown in FIG. 9, which cross section is taken along plane 11—11 as shown in FIG. 9. The assembly 84 of the pressure detector panels 72 and 73 is pivotably supported by the structure belonging to the bluff body 69 by a pair of pivoting supports 85 and 86, wherein the pivoting axis 87 passing through the two pivoting supports 85 and 86 is disposed adjacent to the trailing edge of the bluff body 69 in a parallel relationship with respect to the lengthwise axis of the bluff body 69. The oscillatory pivoting motions of the pressure detector panel assembly 84 are detected by the transducer 89 having the same elements and arrangements as that described in conjunction with FIG. 7.

Figure 12:
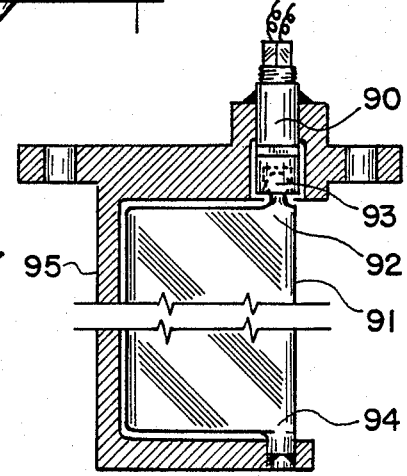
FIG. 12 illustrates a cross section of another embodiment of the combination of a bluff body and compound pressure detector panels arranged in accordance with the principles of the present invention.

In FIG. 12 there is illustrated a cross section of another embodiment of the vortex generator-detector, which cross section is equivalent to that shown in FIG. 11. Ths vortex generator-detector has the same construction and arrangement as that shown in FIGS. 9, 10 and 11 with one exception being that the transducer 90 having the same elements and arrangement as that described in conjunction with FIG. 3, detects the oscillatory lateral deflections of the pressure detector assembly 91 instead of the oscillatory pivoting motions. The first extremity of the pressure detector panel assembly 91 is connected to the transducer 90 by a swivel or pivoting joint 93 as described in conjunction with FIG. 3, while the second extremity 94 is fixedly, simply or semifixedly secured to the structure belonging to the bluff body 95.

Figures 13, 14:
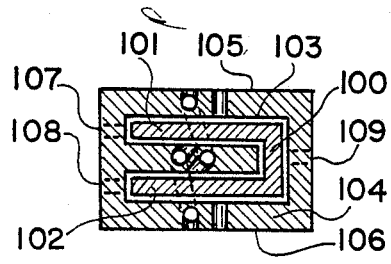
FIG. 13 illustrates a cross section of a further embodiment of the combination of a bluff body and compound pressure detector panels of the present invention.
FIG. 14 illustrates a cross section of an embodiment of the combination of a bluff body and compound pressure detector panels that is capable of measuring fluid velocity in two way flows.

In FIG. 13 there is illustrated a cross section of a further embodiment of the vortex generator-detector of the present invention which has construction and arrangement similar to the vortex generator-detector illustrated in FIGS. 9, 10 and 11 or FIG. 12. The bluff body 96 includes three planar cavities or planar slots respectively engaged by three pressure detector panels belonging to the pressure detector panel assembly 97. The first sides of the three detector panels facing the first lateral side 98 of the bluff body 96 are exposed to the fluctuating pressure of the fluid adjacent to the first lateral side 98 of the bluff body by first sets of pluralities of pressure transmitting holes, while the second sides of the three pressure detector panels facing the second lateral side 99 of the bluff body 96 are exposed to the fluctuating pressure of the fluid adjacent to the second lateral side 99 of the bluff body 96 by second sets of pluralities of pressure transmitting holes, which pressure transmitting holes are disposed through the bluff body 96 in an arrangement similar to the pressure transmitting holes illustrated in FIGS. 9 and 10. It is clear that any number of pressure detector panels may be included in the type of vortex generator-detector shown in FIGS. 9 and 13, depending on the availability of the space within the bluff body for the inclusion of as many planar cavities as possible. In general, the greater the number of pressure detector panels, the lower the fluid velocity measurable by the vortex shedding flowmeter becomes, as the amplitude of the oscillatory pivoting motions or oscillatory lateral deflections of the pressure detector panel assembly produced by a given magnitude of the pressure fluctuations accompanying the vortex shedding becomes greater in proportion to the number of the pressure detector panels included in the assembly thereof. In order to measure the vortex shedding frequencies from the signals generated by the transducer, the amplitude of the vortex signals has to be greater than that of the noise signals generated by the pipeline vibration. The teachings of the present invention provide one of the most effective means for mechanically amplifying the vortex signals without amplifying the noise signals.

In FIG. 14 there is illustrated a cross section of yet another embodiment of the vortex generator-detector of the present invention, which is designed and operating on the same principles as those combinations respectively shown in FIGS. 9 and 13. The U-shaped pressure detector assembly 100 including a pair of pressure detector panels 101 and 102 is completely confined within a cavity 103 of U-shaped cross section included in the bluff body 104 having a rectangular cross section. The first sides of the pressure detector panels facing the first lateral side 105 of the bluff body 104 are exposed to the pressure of the fluid adjacent to the first lateral side 105 by first sets of pluralities of pressure transmitting holes, while the second sides of the pressure detector panels facing the second lateral side 106 of the bluff body 104 are exposed to the pressure of the fluid adjacent to the second lateral side 106 by the second sets of pluralities of pressure transmitting holes, which holes are disposed in an arrangement similar to these shown in FIGS. 9 and 10. The vent holes such as the holes 107, 108, 109, etc. may be included in order to provide means for ventilating the cavity 103. The oscillatory motions of the pressure detector assembly 100 are detected by the transducer arranged in the same manner as those illustrated in FIG. 11 or 12. The particular embodiment shown in FIG. 14 has a cross section symmetric in the up and downstream directions and, consequently, measures fluid flows in both directions. It should be mentioned that those embodiments shown in FIG. 9 or 13 may include a bluff body with a rectangular cross section instead of one with a taperzoidal cross section. The specific cross sectional geometry of the bluff body is a matter of design, which should be determined on the basis of vortex shedding characteristics as well as the design requirement dictated by the combination of the bluff body and the pressure detector assembly.

While the principles of the present invention have now been made clear by the illustrative embodiments, there will be obvious to those skilled in the art many modifications of the structures, arrangements, proportions, elements and materials which are particularly adapted to the specific working environments and operating conditions in the practice of the invention without departing from those principles.

I claim:

1. A vortex generator-detector for measuring flow rate of fluids comprising in combination :
   (a) a bluff body of elongated structure disposed across a flow passage in approximately perpendicular angle with respect to the direction of fluid flow, said bluff body including a blunt leading edge face disposed substantially perpendicular to the direction of the fluid flow and a first lateral face and a second lateral face disposed intermediate said leading edge face and trailing edge of said bluff body;
   (b) a planar cavity included in said bluff body intermediate said first and second lateral faces of the bluff body;
   (c) a planar member disposed within said planar cavity in a substanially parallel relationship with clearance wherein at least one extremity of said planar member is secured to the bluff body;
   (d) a first set of pressure transmitting openings extending from said first lateral face of the bluff body to the first side surface of said planar cavity and a second set of pressure transmitting openings extending from said second lateral face of the bluff body to the second side surface of said planar cavity, wherein said first side surface is opposite to said second side surface defined in relation to one of the two lateral faces of the bluff body;
   (e) a transducer means connected to the other extremity of said planar member opposite to said one extremity for coverting oscillatory mechanical deflections of said planar member created by oscillatory pressure differences across said first and second lateral faces of the bluff body to electrical signals.

2. The combination as set forth in claim 1 wherein said combination includes electronic data processing means for extracting and processing frequencies of said oscillatory pressure differences from said electric signals as a measure of the rate of fluid flow moving through said flow passage.

3. The combination as set forth in claim 1 wherein said combination includes a first set of pressure communicating openings breaking through said first lateral face of the bluff body and a second set of pressure communicating openings breaking through said second lateral face, wherein said first and second sets of the pressure communicating openings are connected to each other by at least one hole disposed through the bluff body around said planar cavity.

4. The combination as set forth in claim 3 wherein said combination includes electronic data processing means for extracting and processing frequencies of said oscillatory pressure differences from said electrical signals as a measure of the rate of fluid flow moving through said flow passage.

5. The combination as set forth in claim 1 wherein said planar member is pivotably supported by the bluff body wherein said transducer means detects oscillatory pivoting motions of said planar member about an axis substantially parallel to the lengthwise axis of the bluff body.

6. The combination as set forth in claim 1 wherein said cavity includes at least one opening extending from one edge of said planar cavity adjacent to the trailing edge of the bluff body to the trailing edge of the bluff body.

7. The combination as set forth in claim 6 wherein said combination includes electronic data processing means for extracting and processing frequencies of said oscillatory pressure differences from said electrical signals as a measure of the rate of fluid flow moving through said flow passage.

8. A vortex generator-detector for measuring flow rate of fluids comprising in combination :
   (a) a bluff body of elongated structure disposed across a flow passage in approximately perpendicular angle with respect to the direction of fluid flow, said bluff body including a blunt leading edge face disposed substantially perpendicular to the direction of the fluid flow and a first lateral face and a second lateral face disposed intermediate said leading edge face and trailing edge of said bluff body;
   (b) a plurality of planar cavities included in said bluff body in a parallel arrangement in said bluff body intermediate said first and second lateral faces of the bluff body;
   (c) a plurality of planar member disposed in a parallel arrangement and connected to each other, each of said plurality of planar members engaging each of said plurality of planar cavities in a substantially parallel relationship with clearance;
   (d) a first set of plurality of openings breaking through said first lateral face of the bluff body and extending to first side surfaces of at least one of said plurality of planar cavities; and a second set of plurality of openings breaking through said second lateral face of the bluff body and extending to second side surfaces of at least one of said plurality of planar cavities, wherein said second side surfaces are opposite to said first side surfaces defined in relation to one of the two lateral faces of the bluff body;
   (e) a transducer means for converting oscillatory mechanical deflections of assembly of said plurality of planar members created by oscillatory pressure differences across said first and second lateral faces of the bluff body.

9. The combination as set forth in claim 8 wherein said combination includes electronic data processing means for extracting and processing frequenices of said oscillatory pressure differences from said electrical signals as a measure of the rate of fluid flow moving thorugh said flow passage.

10. The combination as set forth in claim 8 wherein one extremity of the assembly of said plurality of planar members is supported by the bluff body and the other extremity is connected to said transducer means that detects oscillatory pivoting motions of the assembly of said plurality of planar members about an axis parallel to the direction of flow.

11. The combination as set forth in claim 10 wherein said combination includes electronic data processing means for extracting and processing frequencies of said oscillatory pressure differences from said electrical signals as a measure of the rate of fluid flow moving through said flow passage.

12. The combination as set forth in claim 8 wherein the assembly of said plurality of planar members is pivotably supported by the bluff body wherein said transducer means detects oscillatory pivoting motions of the assembly of said plurality of planar members about an axis substantially parallel to the lengthwise axis of the bluff body.

13. The combination as set forth in claim 12 wherein said combination includes electronic data processing means for extracting and processing frequenices of said oscillatory pressure differences from said electrical signals as a measure of the rate of fluid flow moving through said flow passage.

14. The combination as set forth in claim 8 wherein said plurality of planar cavities are open to trailing edge face of the bluff body opposite to the leading edge of the bluff body, and said plurality of planar members engaging said plurality of planar cavities extend through the trailing edge face of the bluff body whereat said plurality of planar members merge to an integrated structure connected to said transducer means.

15. The combination as set forth in claim 8 wherein said plurality of planar cavities are connected to each other by an additional planar cavity disposed in a perpendicular angle to said plurality of planar cavities, and said plurality of planar members engaging said plurality of planar cavities are connected to each other by a planar member disposed in said additional planar cavity.

16. The combination as set forth in claim 15 wherein the bluff body has a cross section symmetrical with respect to a plane parallel to the leading edge face of the bluff body and disposed intermediate the leading edge face and the trailing edge of the bluff body.

17. The combination as set forth in claim 8 wherein one extremity of the assembly of said plurality of planar members is secured to the bluff body and the other extremity is connected to said transducer means that detects oscillatory deflections of the assembly of said plurality of planar members in directions generally perpendicular to a plane parallel to said plurality of planar members.

18. The combination as set forth in claim 17 wherein said combination includes electronic data processing means for extracting and processing frequencies of said oscillatory pressure differences from said electrical signals as a measure of the rate of fluid flow moving through said flow passage.

19. The combination as set forth in claim 18 wherein the bluff body has a cross section symmetrical with respect to a plane parallel to the leading edge face of the bluff body and disposed intermediate the leading edge face and the trailing edge of the bluff body.

* * * * *